United States Patent [19]
Sikora et al.

[11] Patent Number: 5,382,607
[45] Date of Patent: Jan. 17, 1995

[54] CATHODIC ELECTRODEPOSITION COATINGS CONTAINING ZINC HYDROXYPHOSPHITE PIGMENT

[75] Inventors: Robert J. Sikora, Detroit; Allisa Gam, Troy; Ding Y. Chung, Rochester Hills, all of Mich.

[73] Assignee: E. I. Du Pont de Nemours and Company, Wilmington, Del.

[21] Appl. No.: 133,684

[22] Filed: Oct. 7, 1993

Related U.S. Application Data

[63] Continuation-in-part of Ser. No. 915,874, Jul. 20, 1992, abandoned, which is a continuation-in-part of Ser. No. 784,243, Oct. 29, 1991, abandoned.

[51] Int. Cl.$^6$ .................... C08L 63/00; C08L 63/02
[52] U.S. Cl. .................... 523/415; 525/528; 525/45
[58] Field of Search .................... 523/415; 525/528; 528/45

[56] References Cited

U.S. PATENT DOCUMENTS

| | | | |
|---|---|---|---|
| 3,922,253 | 11/1975 | Jerabek et al. | 523/415 |
| 4,137,140 | 1/1979 | Belanger | 204/181 C |
| 4,419,467 | 12/1983 | Wismer et al. | 523/414 |
| 4,468,307 | 8/1984 | Wismer et al. | 204/181 C |
| 4,649,170 | 3/1987 | Reid | 524/556 |

*Primary Examiner*—Frederick Krass
*Attorney, Agent, or Firm*—Hilmar L. Fricke

[57] ABSTRACT

An improved aqueous electrocoating composition having a binder of an epoxy-amine adduct and a blocked polyisocyanate crosslinking agent; wherein the improvement is the use of zinc hydroxyphosphite pigment as a corrosion inhibitive pigment and an as a curing catalyst which provides an excellent cure under overbake and underbake conditions and forms a coating with excellent chip resistance and the throwing power of the electrocoating composition is significantly improved.

4 Claims, No Drawings

CATHODIC ELECTRODEPOSITION COATINGS CONTAINING ZINC HYDROXYPHOSPHITE PIGMENT

CROSS REFERENCE TO RELATED APPLICATION

This application is a continuation-in-part of Ser. No. 07/915,874 filed Jul. 20, 1992 now abandoned which is a continuation-in-part of Ser. No. 07/784,243 filed Oct. 29, 1991 now abandoned.

BACKGROUND OF THE INVENTION

This invention is directed to a cathodic electrocoating composition and in particular to a cathodic electrocoating composition containing zinc hydroxyphosphite pigment as a corrosion inhibitive pigment and a supplementary catalyst.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition containing an aqueous emulsion of film forming polymer and acts as an electrode in the electrodeposition process. An electric current is passed between the article and a counter-electrode in electrical contact with the aqueous emulsion until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from a polyepoxide which has been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at a sufficient temperature to produce a crosslinked finish on the article.

Cathodic electrocoating compositions and resin compositions, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

Currently lead based pigments are used as corrosion inhibiting pigments and a variety of catalysts and combination of catalysts are used. It would be desirable to use a non-lead containing pigment that provides the electrocoating bath with improved throwing power and catalyzes the curing reaction of the deposited film to form a film that has good corrosion resistance and cures to a high quality finish even when underbaked during curing and has good chip resistance in the event the film is overbaked during curing. Underbaking for a typical commercial cathodic electrocoating composition is about 10°–15° C. below the standard baking temperature and similarly, overbaking is about 10°–15° C. over the baking temperature.

SUMMARY OF THE INVENTION

An improved aqueous electrocoating composition having a binder of an epoxy-amine adduct and a blocked polyisocyanate crosslinking agent; wherein the improvement is the use of zinc hydroxyphosphite pigment of the formula $ZnO\ [2Zn(OH)_2 \cdot ZnHPO_3]$ to provide improved throwing power and as a corrosion inhibitive pigment and an as a curing catalyst.

DETAILED DESCRIPTION OF THE INVENTION

The improved cathodic electrocoating composition of this invention uses zinc hydroxyphosphite pigment without the commonly used lead corrosion inhibitive pigments and surprisingly provides an electrocoating composition having improved throwing power and a cured coating that has excellent corrosion protection. It has also been found that by using zinc hydroxyphosphite pigment with a metal catalyst such as dibutyl tin oxide, dibutyl tin dilaurate or alkyl tin diacetyl acetonate an electrocoating composition is formed that has excellent underbake cure and does not sacrifice chip resistance after it has been cured under overbake conditions. The significant improvement in throwing power in comparison to conventional compositions that do not use this pigment is unexpected.

Typical cathodic electrocoating compositions contain lead corrosion inhibitive pigments to form coating that have good corrosion resistance properties. Useful lead pigments include lead silicate, lead cyanamide, lead chromate and lead silicochromate. Due to health and environmental hazards of these types of pigments, they are being replaced with other corrosion inhibitive pigments that provide equivalent or better corrosion protection. It was not known that zinc hydroxyphosphite pigment could be used in cathodic electrocoating compositions and it was not known that it could be used as a supplementary catalyst to promote crosslinking especially at underbake temperatures.

The zinc hydroxyphosphite pigment has the forumla $ZnO\ [2Zn(OH)_2 \cdot ZnHPO_3]$ an typically is used in electrocoating compositions in a, pigment to binder ratio of about 0.001:1 to 0.1:1 and preferably, of about 0.003:1 to 0.03:1. In relation to the metal catalyst, the pigment is used in a weight ratio of about 1.0:1.0 to 3.0:1.0.

Most principal emulsions used in an electrocoating composition which are the binder of the composition comprise an aqueous emulsion of an epoxy amine adduct blended with a cross-linking agent which has been neutralized with an acid to form a water soluble product. Generally, a metal catalyst is added to a blend of the epoxy amine adduct and crosslinking agent before water is added to form an emulsion. The catalyst is added in solution and mixed with the blend of epoxy amine adduct and crosslinking agent.

Useful epoxy amine adducts are generally disclosed in U.S. Pat. No. 4,419,467 which is incorporated herein by reference.

Typically, the epoxy amine adduct is of an epoxy resin of a epoxy terminated polyepoxy hydroxy ether resin reacted with a primal or secondary amine or a ketimine or mixtures thereof. The amine and hydroxy groups are neutralized with an acid such as lactic acid, acetic acid, formic acid or sulfamic acid to form cationic groups and form an adduct that is water dispersible.

The epoxy terminated polyepoxy hydroxy ether resin has a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of polyhydric phenols such bisphenol A. These polyepoxides can be produced by etherification of polyhydric phenols with epihalohydrin or dihalohydrin such as epiclorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-bis(hydroxymethyl)cyclohexane, 1,3-bis(hydroxymethyl)cyclohexane, 1,2 cyclohexane diol, 1,4 cyclohexane diol and hydrogenated biphenol A.

The polyepoxides have molecular weights of at least 200 and preferably within the range of 200 to 3000, and more preferably about 340 to 2000.

A flexibilizer can be added to the epoxy amine adduct of a polyepoxide as described above extended with a pololyalkylene diamine such as polyoxypropylene diamine having a molecular weight of about 2000 or a polycaprolactone diol or an ethoxylated Bisphenol A.

Typically useful primary and secondary amines that can be used to form the epoxy amine adduct are diethyl amine, methyl ethyl amine, methyl ethanol amine, ethyl ethanol amine, mono ethanol amine, ethyl amine, diisopropyl amine, butyl amine, dibutyl amine and the like.

Ketimines useful in this invention are formed from ketones and primary amines. The water formed is removed, for example, by azeotropic distillation. Usefull ketones include dialkyl, diaryl and alkylaryl ketones having 3-13 carbons atoms. Specific examples include acetone, methyl ethyl ketone, methyl n-butyl ketone, methyl isobutyl ketone, methyl isoamyl ketone, methyl aryl ketone, ethylisomyl ketone, ethyl amyl ketone, aceophenone and benzophenone. Suitable diamines are ethylene diamine, 1,3-diamopropane, 1,4-diaminobutane, 1,6-diaminohexane, 4,9-dioxadodecone, 1,12-diamine and the like. One typically useful ketimine is diketimine (ketimine of diethylene triamine and methyl isobutyl ketone).

Preferred crosslinking agents are also well known in the prior art and are aliphatic, cycloaliphatic and aromatic isocyanates such as hexamethylene diisocyanate, cyclohexamethylene diisocyanate, toluene diisocyanate, methylene diphenyl diisocyanate and the like. Adducts of the organic diisocyanate and a polyol such as the adduct toluene diisocyanate and trimethylol propane also can be used. These isocyanates are prereacted with a blocking agent such as oximes, alcohols, and caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder resin of the epoxy amine adduct and the blocked isocyanate are the principal resinous ingredients in the electrocoating composition and are usually present in amounts of about 40 to 60 percent by weight of epoxy amine adduct and 60 to 40 percent by weight of blocked isocyanate.

Besides the binder components described above, the electrocoating composition usually contains pigment which is incorporated into the composition in the form of a pigment paste. The pigment paste is prepared by grinding or dispersing a pigment into a grinding vehicle, and optional ingredients such as wetting agents, surfactants, and defoamers are added. Any of the pigment grinding vehicles that are well known in the art can be used. After grinding, the particle size of the pigment should be as small as practical, generally, the particle size is about 6-8 using a Hegman grinding gauge.

Zinc hydroxyphosphite is added to the pigment paste with other pigments which include titanium dioxide, carbon black, iron oxide, clay and the like. Pigments with high surface areas and oil absorbencies should be used judiciously because these can have an undesirable affect on coalescence and flow of the electrodeposited coating. It is possible to form a pigment paste of the zinc hydroxyphosphite pigment separately and add it to the paste or to the electrocoating bath directly.

The pigment to binder weight ratio of all the pigments used also is important and should be preferably less than 0.5:1, more preferably less than 0.4:1, and usually about 0.2 to 0.4:1. Higher pigment to binder weight ratios have also been found to adversely affect coalescence and flow.

The coating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 2.0 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight binder solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium generally contains a coalescing solvent or solvents. Useful coalescing solvents include hydrocarbons, alcohols, polyols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the binder solids.

The following example illustrates the invention. All parts and percentages are on a weight basis unless otherwise indicated.

EXAMPLE 1

Preparation of Epoxy Amine Adduct

The following ingredients were charged into a suitable reaction vessel: 1478 parts Epon 828® (epoxy resin of diglycidyl ether of Bisphenol A from Shell Chemical Company having an epoxy equivalent weight of 188); 533 parts ethoxylated Bisphenol A having a hydroxy equivalent weight of 247; 421 parts of Bisphenol A; and 121 parts xylene. The resulting reaction mixture was heated to 160° C. under a nitrogen blanket and held at this temperature for 1 hour. 5.1 parts dimethyl benzyl amine were added and the mixture was held at 147° C. until a 1150 epoxy equivalent weight was obtained. The reaction mixture was cooled to 98° C. and 168 parts of diketimine (reaction product of diethylene triamine and methyl isobutyl ketone at 72.7% solids) and 143 parts of methyl ethanol amine were added. The resulting mixture was held at 120° C. for 1 hour and then 727 parts of methyl isobutyl ketone were added. The resulting resin solution had a non-volatile content of 75%.

Preparation of Quaternizing Agent

| | Parts by Weight |
|---|---|
| Blocked Isocyanate Solution (2-Ethylhexanol half capped toluene diisocyanate in methyl isobutyl ketone) | 320.0 |
| Dimethylethanol amine | 87.2 |
| Aqueous lactic acid solution | 117.6 |
| 2-Butoxyethanol | 39.2 |
| Total | 564.0 |

The quaternizing agent was prepared by adding dimethylethanol amine to the blocked isocyanate solution in a suitable reaction vessel at ambient temperature. An exothermic reaction occurs and the reaction mixture was stirred for one hour and held at a temperature of 80° C. Lactic acid solution was added followed by the addition of 2-butoxyethanol. The reaction mixture was stirred for an additional hour at 65° C. to form the quaternizing agent.

Preparation of Pigment Grinding Vehicle

| | Parts by Weight |
|---|---|
| Epon ® 829(epoxy resin of diglycidyl) ether of Bisphenol A from Shell Chemical Company having an epoxy equivalent weight of 192–203) | 710.0 |
| Bisphenol A | 289.6 |
| Blocked isocyanate solution (described above) | 406.0 |
| Quaternizing Agent (prepared above) | 496.3 |
| Deionized water | 71.2 |
| 2-Butoxyethanol | 1095.2 |
| Total | 3068.3 |

Epon 829 ® and Bisphenol A were charged under a nitrogen atmosphere to a suitable reaction vessel and heated to 150°–160° C. to initiate an exothermic reaction. The reaction was allowed to continue for one hour. The reaction mixture was cooled to 120° C. and the blocked isocyanate solution was added. The temperature of the reaction mixture was held at 110°–120° C. for one hour, followed by the addition of 2-butoxyethanol. The reaction mixture then was cooled to 85°–90° C., homogenized and then the deionized water was added followed by the addition of the Quaternizing agent. The reaction mixture was held at about 80°–85° C. until an acid value of about 1 was obtained. The resulting mixture had a solids content of about 58%.

Preparation of Emulsion

| | Parts by Weight |
|---|---|
| Epoxy amine adduct (prepared above) | 840 |
| Crosslinking Resin Solution[1] | |
| Downol PPH ® (from Dow Chemical Co.) | 10 |
| Surfactant[2] | 15 |
| Deionized water | 1349 |
| Lactic acid | 35 |
| total | 2778 |

[1]Crosslinking resin solution is formed from half-capping toluene diisocyanate (80/20 2,4/2,6 isomer mixture) with 2-hexyloxy ethanol and reacting the resulting product with trimethyl propane in a 3:1 molar ratio is methyl isobutyl ketone to form a 70% solids solution.

[2]Surfactant is a mixture of 120 parts Amine C from Ciba-Geigy, 120 parts acetylenic alcohol, commercially available as Surfynol "104", 120 parts of 2-butoxy ethanol and 221 parts of deionized water and 19 parts glacial acetic acid.

The epoxy amine adduct was thoroughly mixed with the crosslinking resin solution, Downol PPH ®, lactic acid and the surfactant. Deionized water was added under agitation to form a dispersion. The resulting dispersion has a solids content of 36% and a pH of 6.8.

Preparation of Pigment Pastes A, B, & C

| | Parts by Weight | | |
|---|---|---|---|
| | A | B | C |
| Pigment Grinding Vehicle (prepared above) | 203 | 203 | 203 |
| Deionizing water | 415 | 415 | 415 |
| Carbon black pigment | 5 | 5 | 5 |
| Aluminum silicate pigment | 64 | 64 | 64 |
| Lead silicate pigment | — | 21 | — |
| Dibutyl tin oxide | 32 | 32 | 32 |
| Titanium dioxide pigment | 281 | 260 | 260 |
| Zinc Hydroxyphosphite pigment | — | — | 21 |
| Total | 1000 | 1000 | 1000 |

For each pigment paste A, B, & C, the above constituents were charged into a conventional sand mill and ground to a No. 7 Hegman fineness.

| Preparation of an Electrocoating Baths A-C | |
|---|---|
| | Parts by Weight Bath No. 1 |
| Emulsion (prepared above) | 1620 |
| Pigment Paste A (prepared above) | 329 |
| Deionized water | 1751 |
| Total | 3700 |

Electrocoating bath A was prepared by blending the above ingredients together. Electrocoating Baths B and C were prepared using the same constituents in the above amounts except for Bath B, Pigment Paste B was used instead of Pigment Paste A and for Bath C Pigment Paste C was used instead of Pigment Paste A. Three sets of two zinc phosphate coated cold-rolled steel panels each were cathodically electrocoated in each bath at 275 volts for 2 minutes at a bath temperature of 28° C. One set of each of the coated panels was bake at 165° C. for 17 minutes, the second set of panels was baked at 182° C. for 17 minutes and the third set was baked at 200° C. for 17 minutes.

One set of panels from each bath was tested for solvent resistance. The panels were double rubbed with a cloth soaked in methyl ethyl ketone and the number of rubs were counted before there was damage to the coating. The results are as follows:

| Solvent Resistance | Bath A | Bath B | Bath C |
|---|---|---|---|
| Bake Temp. 165° C. | 5 | >51 | >50 |
| Bake Temp. 182° C. | >50 | >50 | >50 |
| Bake Temp. 200° C. | >50 | >50 | >50 |

The second set of panels from each bath was coated with an acrylic enamel topcoat. The topcoats were cured at 130° C. for 17 minutes to form a topcoat about 1.8 mils thick. The chip resistance of each of the panels was measured using a standard gravelometer. The results are determined as the percentage of paint area lost after being subjected to the gravelometer and are as follows:

| Chip Resistance | Bath A | Bath B | Bath C |
|---|---|---|---|
| Bake Temp. 165° C. | 13.2% | 4.7% | 6.5% |
| Bake Temp. 182° C. | 2.9% | 4.5% | 3.8% |
| Bake Temp. 200° C. | 2.4% | 4.4% | 3.4% |

Each of the panels from the third set of panels from each bath was scribed through the coating and into the metal and each panel was subjected to 20 cycles of GM scab corrosion test. A cycle of the test consisted of soaking a panel in an ambient temperature 5% salt solution for 24 hours. The panel was dried and placed in a relative humidity cabinet at 60° C. and 85% RH. A hot cold cycle was incorporated into cycles 1, 6, 11 and 16 in which the panel was heated to 60° C. and cooled to −9° C. After 20 cycles, each panel was blown off with compressed air and scraped to remove loose paint. The creep was measured in millimeter i.e., the distance the paint flaked away from the scribe mark on the panel.

| Scab Corrosion | Bath A | Bath B | Bath C |
|---|---|---|---|
| Bake Temp. 165° C. | 11.1 | 2.9 | 0.9 |
| Bake Temp. 182° C. | 0.9 | 1.4 | 0.8 |
| Bake Temp. 200° C. | 0.8 | 1.0 | 1.0 |

The above results show that zinc hydroxy phosphite pigment which was present in Bath C but not in baths A & B provides a finish that has excellent cure under underbake conditions (165° C. bake) as shown by the solvent resistance test and chip resistance test and is a good corrosion inhibitor as shown by the scab corrosion test.

EXAMPLE 2

Electrocoating baths D, E. & F were prepared and the throwing power of each of these baths was measured.

Preparation of Flex Emulsion Additive

A flex emulsion additive was prepared by charging 2322 parts by weight of Jeffamine ® D-2000 (a polyoxypropylene diamine having a molecular weight of about 1992 from Texaco Company) to a reaction vessel under a nitrogen atmosphere and heated to 90° C., followed by the addition of a solution of 859 parts by weight of Epon ® 1001 (polyglycidyl ether of bisphenol A having an epoxy, equivalent of 500 from Shell Chemical Company) in 345 parts by weight of 2-butoxyethanol. The resulting reaction mixture was dispersed by combining 68 parts by weight of acetic acid and 5354 parts of deionized water.

| Preparation of Emulsion | |
|---|---|
| | Parts by Weight |
| Epoxy amine adduct (prepared in Example 1) | 1110 |
| Crosslinking Resin Solution (described in Example 1) | 624 |
| Downol PPH ® (from Dow Chemical Co.) | 13 |
| Surfactant (described in Example 1) | 20 |
| Deionized water | 1884 |
| Lactic acid | 48 |
| Total | 3700 |

The epoxy amine adduct was thoroughly mixed with the crosslinking resin solution, Downol PPH ®, lactic acid and the surfactant. Deionized water was added under agitation to form a dispersion. The resulting dispersion has a solids content of 36% and a pH of 6.8.

| Preparation of Pigment Pastes D, E, & F | | | |
|---|---|---|---|
| | Parts by Weight | | |
| | D | E | F |
| Pigment Grinding Vehicle (prepared in Example 1) | 295 | 295 | 295 |
| Deionized water | 476 | 476 | 476 |
| Carbon black pigment | 25 | — | — |
| Aluminum silicate pigment | 57 | — | — |
| Lead silicate pigment | — | 428 | — |
| Dibutyl tin oxide | 18 | — | — |
| Titanium dioxide pigment | 328 | — | — |
| Zinc Hydroxyphosphite pigment | — | — | 428 |
| Total | 1199 | 1199 | 1199 |

For each pigment paste D, E, and F, the above constituents were charged into a conventional sand mill and ground to a No. 7 Hegman fineness.

| Preparation of Electrocoating Baths D-F | | | |
| --- | --- | --- | --- |
| | Parts by Weight | | |
| | D | E | F |
| Emulsion (prepared in Example 1) | 1159 | E | F |
| Flex Emulsion Additive (prepared above) | 131 | 131 | 131 |
| Pigment Paste D (prepared above) | 312 | 294 | 294 |
| Pigment Paste E (prepared above) | — | 18 | — |
| Pigment Paste F (prepared above) | — | — | 18 |
| Deionized Water | 1498 | 1498 | 1498 |
| Total | 3100 | 3100 | 3100 |

Electrocoating baths D-F were prepared by blending the above constituents together. Zinc phosphate coated cold-rolled steel panels were cathodically electrocoated in each bath at a bath temperature of 30° C. for 2 minutes at 150, 150 and 187 volts for baths D-F, respectively. A 0.95 mil thick film was deposited.

The throwing power of each bath was measured according to Ford Laboratory. Test Method MJ BI 20-2C wherein the distance the coating deposits on the inside of a box formed by the panels of 18"×4" is measured. The throwing power of each of the baths was as follows:

| Bath | D | E | F |
| --- | --- | --- | --- |
| Throwing Power (inches) | 9¼ | 9¼ | 10⅜ |

The above data shows that Bath F, which contained the zinc hydroxyphosphite pigment had significantly improved throwing power in comparison to Bath D, which did not contain either the lead silicate or the zinc hydroxyphosphite pigment and Bath E, which only contained the lead silicate pigment.

Each of the above panels coated in Baths D-F were baked at about 182° C. for 17 minutes and had acceptable solvent and corrosion resistance. Another set of panels was prepared as above and baked and topcoated with an acrylic enamel and the enamel was cured at 130° C. for 17 minutes. Each of these panels had acceptable chip resistance as determined by a gravelometer test.

What is claimed is:

1. An improved cathodic electrocoating composition comprising an aqueous carrier having dispersed therein a film forming binder comprising an epoxy-amine adduct of a polyglycidyl ether of a polyhydric phenol reacted with an amine selected from the group consisting of a primary amine, secondary amine, ketimine and any mixture thereof and containing a blocked polyisocyanate curing agent; wherein the improvement comprises the addition of zinc hydroxyphosphite pigment of the formula $ZnO[2Zn(OH)_2 \cdot ZnHPO_3]$ in a pigment to binder weight ratio of about 0.001:1 to 0.1:1 to form an electrocoating composition having improved throwing power.

2. The cathodic electrocoating composition of claim 1 containing a metal catalyst.

3. The cathodic electrocoating composition of claim 2 wherein the metal catalyst is dibutyl tin dilaurate, dibutyl tin oxide or a mixture thereof.

4. The cathodic electrocoating composition of claim 1 wherein the zinc hydroxyphosphite pigment is used in a pigment to binder weight ratio of about 0.003:1 to 0.03:1 and containing a metal catalyst selected from the group consisting of dibutyl tin dilaurate, dibutyl tin oxide, alkyl tin diacetyl acetonate, and mixtures thereof used in a weight ratio of zinc hydroxyphosphite/catalyst of about 1.0:1.0 to 3.0:1.0.

* * * * *